April 21, 1964  G. LOCKER ETAL  3,129,654
TIER
Filed June 24, 1963

INVENTORS
GERHARD LOCKER
PETER L. STURLA &
OTTO W. LUEK
BY Joseph A. Brown
ATTORNEY

United States Patent Office 3,129,654
Patented Apr. 21, 1964

3,129,654
TIER
Gerhard Locker, New Holland, Peter L. Sturla, Churchtown, and Otto W. Luek, New Holland, Pa., assignors to Sperry Rand Corporation, New Holland, Pa., a corporation of Delaware
Filed June 24, 1963, Ser. No. 290,005
2 Claims. (Cl. 100—4)

This invention relates to knotters, twisters and other tiers for hay balers and more particularly to improved means for precisely controlling the time a tying cycle is instituted.

In a conventional hay baler, the bale forming plunger reciprocates at a speed in excess of sixty strokes per minute. Each tying operation to band a completed bale is performed between strokes of the plunger. Thus, the time interval provided for tying is less than one second. For trouble free operation and successful tying of bale after bale without a miss, it is necessary that the institution of the tying cycle be closely controlled and begun at exactly the proper moment.

Also, a given tier design is frequently used on several different baler models. To produce desired operating results and to compensate for variations in manufacturing tolerances it is desirable to provide means whereby the tier may be oriented to properly fit the baler, regardless of the particular model. Further, it is essential that the crank arm and connecting rod to the needle yoke is not over center when the tier is at rest. The stop position of the tier must be such that the crank arm and connecting rod are held properly disposed relative to each other.

One object of this invention is to provide improved clutch control means for baler tiers whereby the beginning of a tying cycle may be closely regulated.

Another object of this invention is to provide tier control means including a stop member which is adjustable in plural directions and then adapted to be locked in proper position.

Another object of this invention is to provide adjustable tier control means so constructed that the tier may be readily adapted to different baler models.

A further object of this invention is to provide a tier control whereby the relation of the crank arm and connecting rod for the needle yoke when the tier is at rest may be so set that the arm and rod may not pass overcenter.

A still further object of this invention is to provide tier control means of the character described which is simple in design whereby it may be manufactured at low cost.

Other objects of this invention will be apparent hereinafter from the specification and from the recital in the appended claims.

Figure 1:
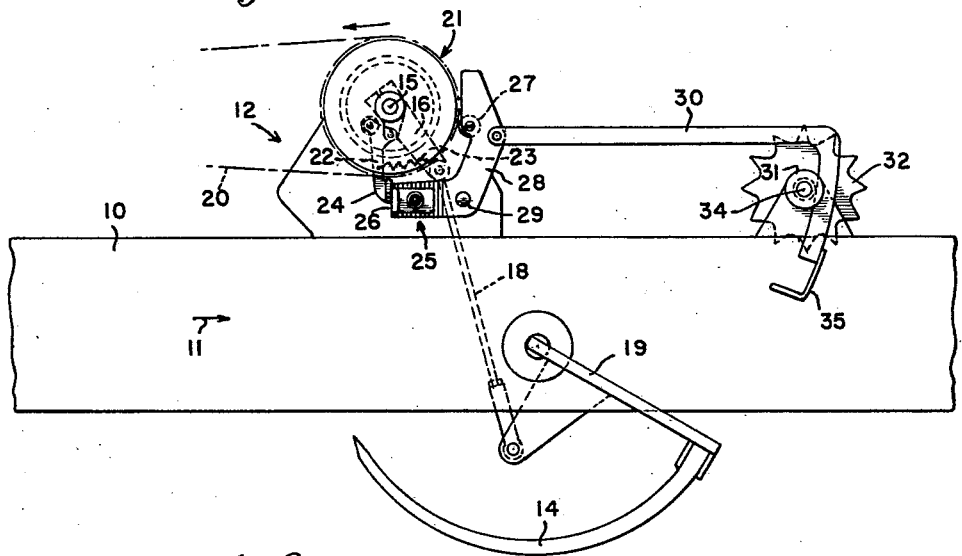
FIG. 1 is a generally diagrammatic side view of a baler bale case and a tier mounted thereon having a clutch controlled by means constructed according to this invention, the clutch being shown disengaged.

Referring now to the drawing by numerals of reference, 10 denotes a bale case in which bales are formed, the bales moving progressively through the case in the direction indicated by the arrow 11. Mounted on top of bale case 10 is a tier mechanism generally denoted 12. A tying medium is adapted to be delivered to the tier by needles 14 normally located adjacent the bottom of the bale case. The tier includes a rotatable timer shaft 15 which extends transverse to the extension of the bale case. The timer shaft is normally stationary, having a crank arm 16 linked by a connecting rod 18 to a yoke 19 which carries the needles 14. The arrangement is conventional and when the timer shaft rotates one revolution, the needles are projected across the bale case 10 to the tier 12 and then retracted back to starting position. This projection of the needles takes place between successive working strokes of the plunger of the baler. When at rest, it is essential that the crank arm 16 and rod 18 be angularly disposed relative to each other, FIG. 1, and not pass over-center.

Figure 2:
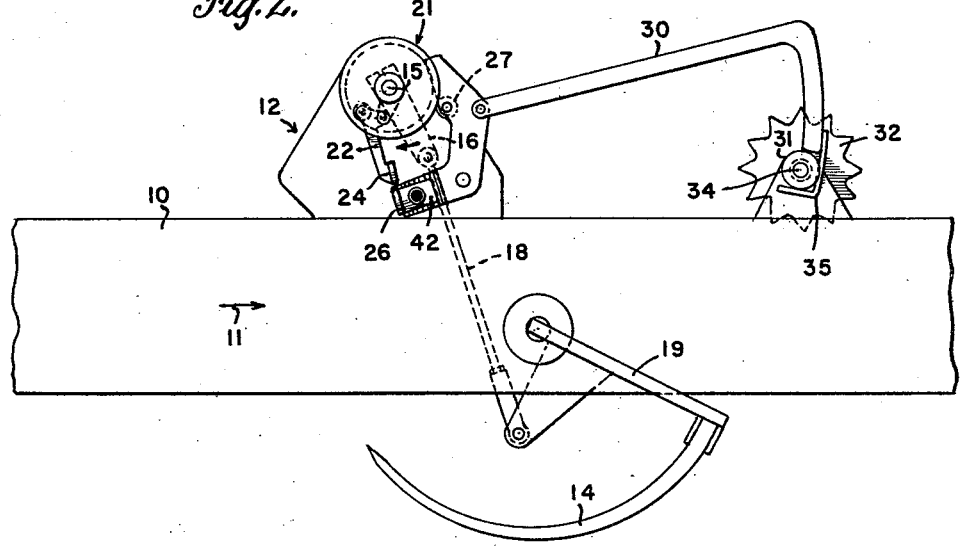
FIG. 2 is a view similar to FIG. 1 showing the control means in tripped position and the clutch engaged.

For rotating timer shaft 15, a source of power 20 is provided such as a chain engageable and continuously driving one element of a clutch generally denoted 21. The clutch includes a pawl 22 which extends radially outwardly of the clutch and having an outer end 24. A spring 23 biases pawl 22 to pivot in a counterclockwise direction when viewed as shown in FIGS. 1 and 2. Such pivotal movement is normally prevented by clutch control means 25 comprising a stop member 26 carried on a control member 28. Control member 28 is pivotally supported at 29 on bale case 10 and biased to pivot in a counterclockwise direction by a spring not shown. The configuration of the control member is such that when it is pivoted from the position shown in FIG. 1 to the position shown in FIG. 2, stop 26 is moved radially outwardly relative to clutch 21 and it is disengaged from pawl 22. This permits spring 23 to actuate pawl 22 and engage the clutch. A roller 27 on member 28 is engaged by a cam, not shown, on the clutch to move stop 26 back to starting position and stop the rotation of shaft 15 after one revolution.

The pivoting movement of control member 18 is regulated by an L-shaped trip arm 30 which extends around a roller 31 rotatably actuated by a metering wheel 32. Roller 31 and wheel 32 are affixed to a common shaft 34. The metering wheel 32 projects through the top wall of bale case 10 and it is rotated responsive to the travel of the bales through the case in the direction of the arrow 11. When the metering wheel is rotated a prescribed amount, the corresponding rotation of the roller 31 lifts trip arm 30. When arm 30 is elevated so that hook 35 reaches roller 31, the arm is freed and shifts longitudinally to the left. Such operation and structure is wholly conventional and therefore it is not described in more detail here.

Figure 4:
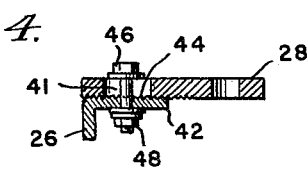
FIG. 4 is a section taken on the line 4—4 of FIG. 3 looking in the direction of the arrows.
Figure 3:
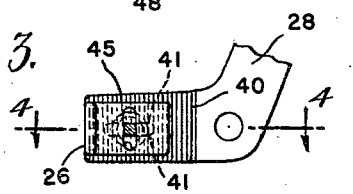
FIG. 3 is an enlarged side elevation showing the structure of the adjustable stop employed in the control means.

The point at which stop 26 leaves the outer end 24 of pawl 22 determines the time when the particular tying cycle will be instituted. Precise control of this timing operation is essential to produce desired operating results and the achievement of tied bales without missing. Further, the engagement of pawl 22 with stop 26 establishes the angular relation of crank arm 16 and connecting rod 18. Specifically, the arm and rod must be held against going over-center. As shown best in FIGS. 3 and 4, the control member 28 has serrations 40 which extend vertically and generally parallel to the extension of the pawl 22 when the pawl is in disengaged position, FIG. 1. The control member also has a slot 41 which is elongated in a horizontal direction transverse to serrations 40. The stop 26 is L-shaped having a portion 42 which abuts against control member 28 and having serrations 44 meshing with the serrations on control member 28. The stop member has a vertical slot 45 which is parallel to the extension of the serrations on the respective members and extends across the slot 41 in control member 28. A bolt 46 is projectable through the slots to connect stop 26 to member 28 and a nut 48 is provided to fasten the parts.

By loosening nut 48 and moving the serrations of stop 26 out of engagement with the serration 40, the stop may be adjusted horizontally toward or away from pawl 22. Bolt 46 slides in slot 41. Also, the location of the stop 26 may be vertically adjusted in the direction of the serration and within the limits of the vertical slot 45. This moves stop 26 radially relative to pawl 22.

Thus, the angular position of pawl 22 is controllable by the horizontal location of the stop 26 relative to control member 28. The point at which the pawl is released by stop 26 when the control member 28 is pivoted from thet position shown in FIG. 1 to the position shown in FIG. 2 is controlled by the vertical or radial location of the stop.

The position of the stop 26 is thus substantially infinitely variable and when in adjusted position it is locked in a desired location by the inter-engaging serrations 40—44 and the bolt 46. There is no danger of the stop slipping after it has been adjusted. The structure provides for the institution of a tying cycle at precisely the proper time. Further, the wide range of adjustments of stop 26 makes the tier 12 readily adapted to various model balers. Also, the proper relation of crank 16 and rod 18 is assured.

While this invenion has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims:

Having thus described our invention, what we claim is:

1. In a hay baler, an elongated bale case, a timer shaft rotatably supported on said bale case and extending transverse thereto, a source of rotatable power, a clutch for connecting said power source to said timer shaft, needle means for projecting a tying medium across said bale case, a crank arm connected to said timer shaft and rotatable therewith, a connecting rod linking said crank arm to said needle means, said crank arm and connecting rod being pivotally connected and forming an angle when the timer shaft is at-rest, and means for controlling the engagement of said clutch comprising a pivoted pawl extending radially outwardly of said clutch, spring means biasing said pawl to pivot in one direction, a stop member normally engaging said pawl and preventing pivotal movement of the pawl by said spring means, a control member pivotally supported on said bale case and being freed to move relative thereto responsive to the formation of bales in said bale case, said stop member being carried on said control member for movement therewith to a location out of engagement wth said pawl, one of said members having a first slot extending generally in the same direction as said pawl when the pawl is engaging the stop member, the other of said members having a second slot crossing said first slot, fastening means extending through said slots to releasably connect the stop member to the control member, the position of said stop member on said control member being variable in plural directions and providing precise control of the disengagement of said pawl and the position of the pawl when in engagement with the stop member whereby a proper angular relationship of said crank arm and connecting rod may be maintained.

2. In a hay baler, an elongated bale case, a timer shaft rotatably supported on said bale case and extending transverse thereto, a source of rotatable power, a clutch for connecting said power source to said timer shaft, needle means for projecting a tying medium across said bale case, a crank arm connected to said timer shaft and rotatable therewith, a connecting rod linking said crank arm to said needle means, said crank arm and connecting rod being tpivotally connected and forming an angle when the timer shaft is at-rest, and means for controlling the engagement of said clutch comprising a pivoted pawl extending radially outwardly of said clutch, spring means biasing said pawl to pivot in one direction, a stop member normally engaging said pawl and preventing pivotal movement of the pawl by said spring means, a control member pivotally supported on said bale case and being freed to move relative thereto responsive to the formation of bales in said bale case, said stop member being carried on said control member for movement therewith to a location out of engagement with said pawl, one of said members having a first slot extending generally in the same direction as said pawl when the pawl is engaging the stop member, the other of said members having a second slot crossing said first slot, fastening means extending through said slots to releasably connect the stop member to the control member, said control member and stop member having inter-engaging serrations which extend parallel to said first slot, the position of said stop member on said control member being variable in plural directions and providing precise control of disengagement of said pawl the position of the pawl when in engagement with the stop member whereby a proper angular relationship of said crank arm and connecting rod may be maintained.

References Cited in the file of this patent

UNITED STATES PATENTS

| | | |
|---|---|---|
| 1,508,386 | Erickson | Sept. 16, 1924 |
| 1,674,085 | Ballard et al. | June 19, 1928 |
| 2,313,532 | Garrett | Mar. 9, 1943 |
| 2,826,283 | Morse | Mar. 11, 1958 |
| 2,897,747 | May | Aug. 4, 1959 |
| 2,911,904 | Weiss | Nov. 10, 1959 |